Aug. 2, 1932.  R. J. JAUCH ET AL  1,869,375
DISPENSING APPARATUS
Filed Oct. 9, 1929  2 Sheets-Sheet 1
Fig. 1.
Fig. 2.
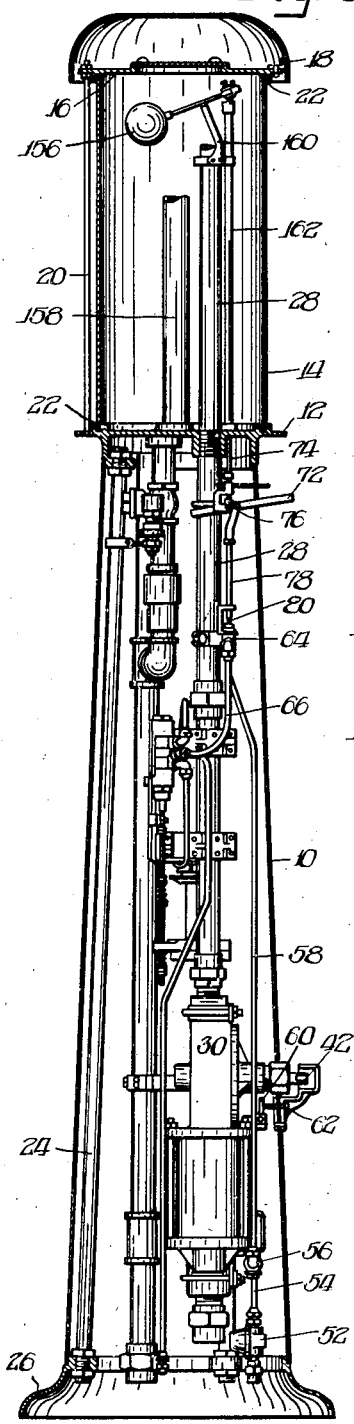
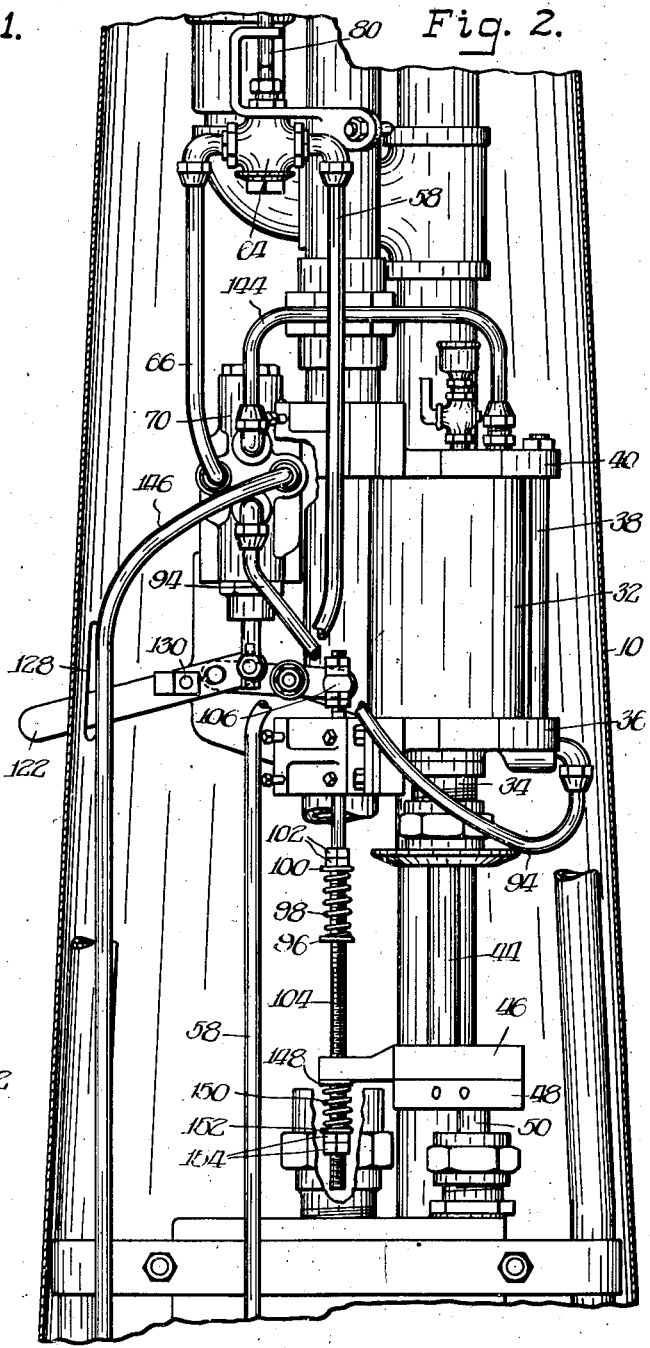
INVENTORS
Robert J. Jauch,
Harry L. Mitchell
By Wilkinson, Huxley, Byron & Knight
ATTORNEYS Aug. 2, 1932.    R. J. JAUCH ET AL    1,869,375
DISPENSING APPARATUS
Filed Oct. 9, 1929    2 Sheets-Sheet 2
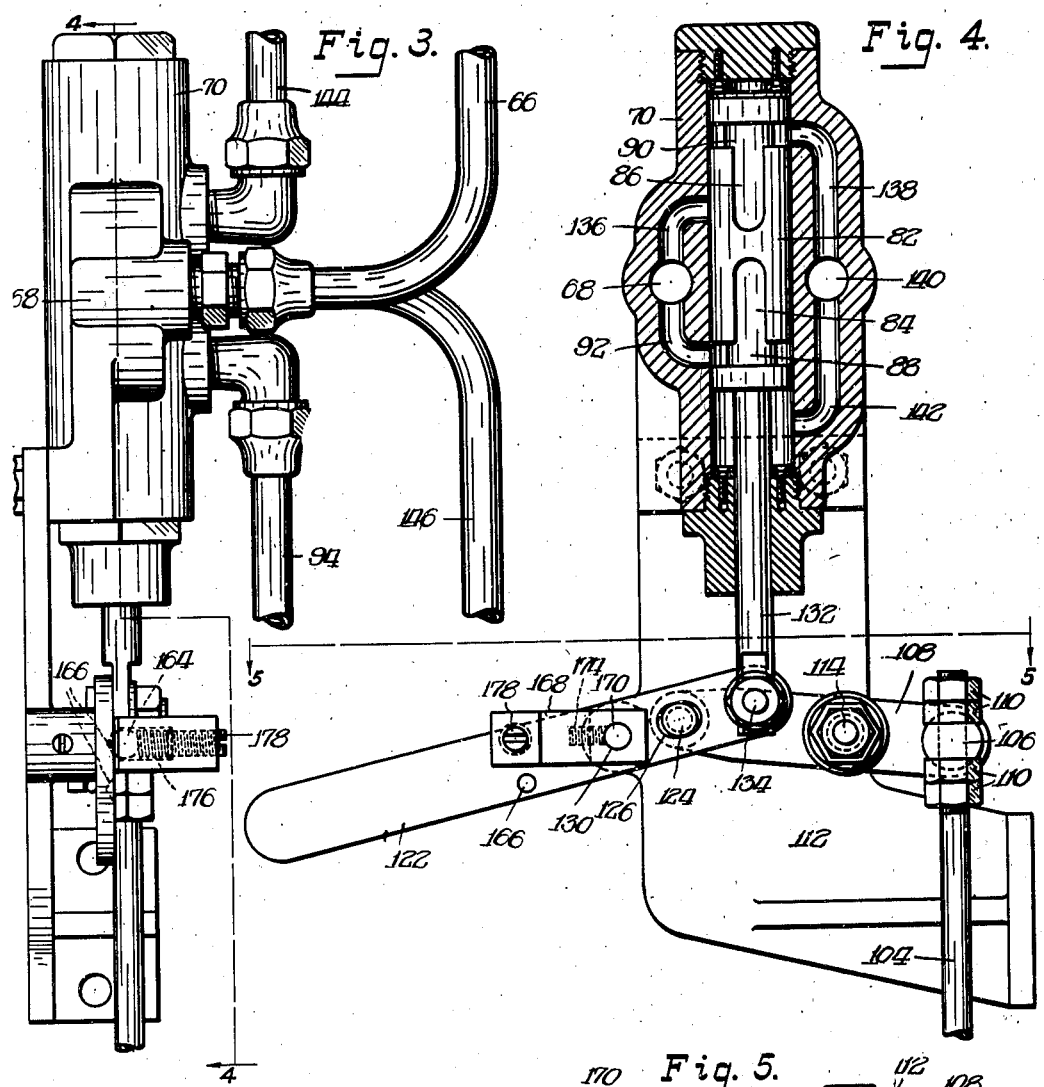
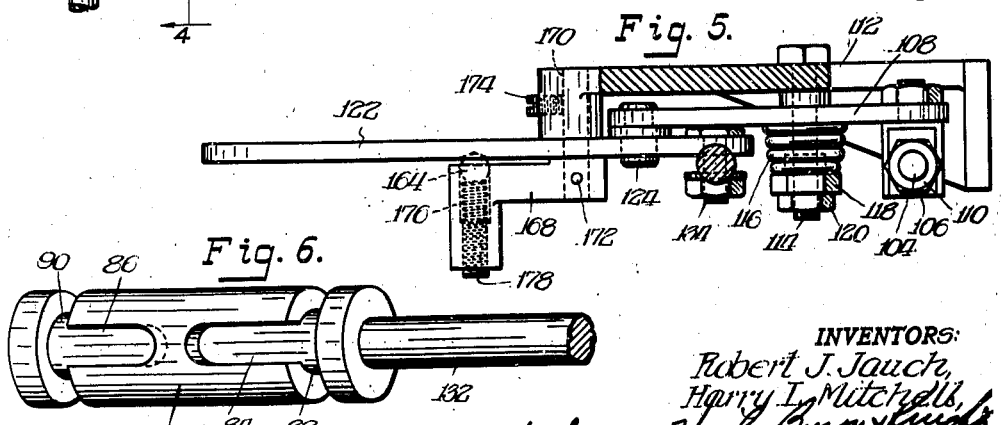
INVENTORS:
Robert J. Jauch,
Harry L. Mitchell,
By Wilkinson, Huxley, Byron & Knight
ATTORNEYS Patented Aug. 2, 1932

1,869,375

UNITED STATES PATENT OFFICE

ROBERT J. JAUCH AND HARRY L. MITCHELL, OF FORT WAYNE, INDIANA, ASSIGNORS TO WAYNE COMPANY, OF FORT WAYNE, INDIANA, A CORPORATION OF INDIANA

DISPENSING APPARATUS

Application filed October 9, 1929. Serial No. 398,310.

This invention pertains to liquid dispensing apparatus and more particularly to fluid control mechanism for filling the measuring container of liquid dispensing devices.

There are a number of liquid dispensing devices now being sold which may generally be classified in two classes—one: the visible type, and two: the meter type. The visible type of liquid dispensing apparatus in general includes an elevated container supported on a standard or casing, said container having a fill pipe through which the liquid is supplied thereto from a suitable pump, an overflow pipe terminating at its upper end within the container at the level for maximum capacity, and a service nozzle connected to the bottom of the elevated container and through which the customer is served with any desired quantity of liquid.

The other type includes in general a flow meter, and a pump for supplying liquid to the meter from which it is delivered through a hose connection after measuring by the meter.

This invention is illustrated in combination with the visible type of liquid dispensing apparatus, and is shown with means for operating the pumping unit either manually or mechanically. In this visible type of liquid dispensing apparatus where automatic air valves are used, difficulty has been encountered due to leakage in the air line, the constant escape of the air and the consequent passage of water of condensation through the valve in time creating rust and spoiling the perfect seating and operation of the valve.

It is therefore an object of this invention to provide liquid dispensing apparatus wherein the ordinary leakage of air in pipes with joints of the device will not in any way injure or prevent the functioning of the automatic air valve.

Another object of the invention is to provide liquid dispensing apparatus wherein the supply of air is controlled for effectively controlling operation of the apparatus.

A further object is to provide liquid dispensing apparatus which is so constructed that flow of air from the compressor line may be sopped to prevent any air from being forced through the system of the apparatus.

Still further object is to provide liquid dispensing apparatus which fulfills all requirements of manufacture and service.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a sectional elevation through the dispensing apparatus;

Figure 2 is a fragmentary enlarged sectional elevation through a portion of the dispensing apparatus shown in Figure 1, the same being taken substantially at right angles to Figure 1;

Figure 3 is a side elevation of a portion of the valve mechanism and associated parts;

Figure 4 is a sectional elevation of the valve mechanism illustrated in Figure 3, the same being taken substantially in the plane as indicated by the line 4—4 of Figure 3;

Figure 5 is a sectional top plan view of the valve mechanism illustrated in Figures 3 and 4, the same being taken substantially in the plane as indicated by the line 5—5 of Figure 4; and Figure 6 is an enlarged perspective elevation of the piston illustrated in Figure 4.

In the embodiment of the device illustrated, the housing 10 forming the pedestal or casing of the apparatus is provided with a bottom head 12, upon which is seated the glass cylinder container 14 which provides a measuring chamber for the gasoline or other fluid to be dispensed. The top head 16 is supported on the top of the container 14, and a dome 18 for advertising or other purposes is attached to the top head 16. Tie rods 20 are disposed between the upper and lower heads for securely clamping the container 14 between cork gaskets 22 disposed between the heads whereby there will be no leakage of the liquid or its vapor from the chamber and all foreign matter is kept out of said chamber.

Other tie rods 24 are provided within the casing 10 and are secured to the lower head and suitable foot portion 26 for completing the unitary assembly.

Gasoline or other liquid to be dispensed is supplied from a suitable source of supply (not shown) to the measuring chamber through a fill pipe 28 by a pump 30, which pump is shown as operated by means of the air cylinder 32 through the usual plunger or piston rod (not shown), it being understood that said piston rod extends through the stuffing box 34 provided in cylinder head 36, said head being secured through the tie rods 38 to head 40. The pump is also adapted to be operated manually through the fitting 42 which receives a removable operating handle. Attached to the piston rod is a plunger rod 44 which in turn is attached to the coupling bar 46 provided with a coupling 48 which is connected to the pump plunger rod 50.

Air is supplied to the air cylinder 32 from an air reservoir (not shown) through the relief valve 52, pipe 54, whistle valve 56 and pipe 58. The whistle valve 56 is held open by means of a lever 60 which is locked in valve-open position by means of the screw 62. The pipe 58 is connected to the whistle valve 64, the valve 64 being connected through the pipe 66 to the inlet 68 of the air valve 70. The whistle valve 64 is held open to permit the passage of air therethrough by depressing the lever 72 to a position where the float trip rod 74 falls back of a notch 76 provided on the rod 78. The rod 78 is forced down by the lever 72 for holding the whistle valve stem 80 in depressed or open position whereby air is permitted to flow through the pipe 66 to the inlet 68 of the valve 70. The valve 70 is provided with a piston 82 having oppositely facing cored passages or ports 84 and 86, said passages opening to passages or ports 88 and 90 provided completely around the piston. The casing of the valve 70 is provided with a cored passage 92 which is adapted to communicate with the port 84 of the piston 82 whereby air is supplied from the inlet 68 to the pipe 94, it being understood that said pipe opens to a port so located in the valve 70 that it is in communication with the port 88 when said port is in communication with passage 92.

The pipe 94 is connected to the bottom of the pump cylinder 32 to supply air thereto whereby the piston therein is forced upward by the air supplied. Upward movement of the piston moves the coupling bar 46 upwardly until it contacts washer 96 provided on the buffer spring 98, said spring being retained by the washer 100 which in turn is limited in its upward movement by the nuts 102 adjustably provided on the rod 104. The rod 104 extends upwardly through a pin 106 provided on the crank or lever 108, said rod being held in position with respect to said pin by means of the nuts 110. The lever is pivoted to the air valve bracket 112 by the bolt 114 on which is mounted a tension spring 116 for rigidly holding the lever 108 in a predetermined position, the spring 116 being controlled in tension position by means of the nuts 118 and 120. The lever 108 is loosely pivoted to the lever 122 by the pin and slot connection 124, 126, the lever 122 extending outwardly of the casing 10 through a slot 128 formed whereby said lever may be manually operated, if such is desired.

Upward movement of the lever 108 tends to pull down on the inner end of the lever 122 due to the pivotal connection 130 between the lever and the bracket 112. Movement of the outer end of the lever 122 in one direction moves piston rod 132 in the opposite direction, as such piston rod is pivoted at 134 to the inner end of said lever through a suitable loose connection. Movement of the piston rod 132 downwardly lowers the piston 82 so that the port 90 is in a line with a cored passage 136 which is in communication with the inlet 68. Alignment of the port 90 and the passage 136 breaks communication between the port 90 and a cored passage 138 extending to the exhaust opening 140, and registering is caused between the port 90 and the cored passage 142 which is also in communication with the exhaust opening 140.

This position of the piston allows the air to flow through the cored passage 136 to the port 90, through port 86, and thence out through pipe 144 which communicates with the upper part of the cylinder 32, that is, introducing air above the piston forcing the plunger downwardly. The air under the plunger is then free to exhaust through the pipe 94 to port 88, through cored passage 142 and to exhaust opening 140, and thence outwardly through exhaust pipe 146. In like manner the air above the piston from the cylinder 32 is free to exhaust when the coupling bar 46 is lowered against the washer 148 and spring 150, which rests on the washer 152 retained on the rod 104 by means of the nuts 154. The travel then of the coupling or cross-head is limited by the nuts 154 and 102, thus controlling the travel of the lever 122 and therefore the piston 82. When the piston 82 is in its up position, that is, when the lever 122 is depressed, the port 90 is in line with the cored passage 138, allowing the air to pass out through the exhaust opening 140 through the cored passage 138, exhaust opening 140 and out through the exhaust pipe 146.

The measuring container is provided with a float 156 disposed adjacent the top opening of the overflow pipe 158, the float 156 being raised by the liquid and connected to the float trip rod 74 so that upward movement of the float raises the float trip rod to thereby pull the trip away from the notch 76, permitting the lever 72 to raise by spring action on the whistle valve stem 80 to thereby shut off the air and stop the pumping action of the pump 30. The float may be limited in its downward movement by the stop 160 conveniently supported on the pipe 28, and the trip rod 74 is of course carried below the measuring chamber through a suitable conduit or casing 162, disposed therearound, the casing forming a convenient pivotal support for the float.

In order to have a positive action of the piston 82, that is, in order for enough pressure to build up to shift the piston to prevent dead centering, the ball 164 is provided registering in an aperture 166 provided in the lever 122, the ball being disposed in a recess in the bracket arm 168, which arm is held in position on the pin 170 by means of the pin 172 and the screw 174, said ball being spring pressed by the spring 176, the action of the spring being controlled by adjusting screw 178. By this construction, the piston 82 is prevented from stopping on dead center, while simple manipulation of the lever 122 controls the position of the piston, should change be desired.

The measuring chamber is provided with the usual overflow pipe 158 whereby the uppermost liquid level is controlled, it being understood that the measuring chamber here shown measures from the top downwardly.

In operation of the device, assuming that the measuring chamber is empty, the float 156 rests in its downward position on the stop 160. The lever 72 is depressed to a position where a portion of the float trip rod 74, secured to the float and extending through the casing 162, falls back of the notch 76 provided on the rod 78. The rod 78 is forced downwardly by the lever 72, thereby depressing the whistle valve stem 80 whereby air is permitted to flow from the source of supply through the relief valve 52, pipe 54, whistle valve 56, which is in normal open position by virtue of the positioning of the lever 60, pipe 58 to pipe 66. The air is then supplied to the valve casing 70 through the port 68, and assuming the piston to be in the position shown in Figure 4, air flows through the cored passage 92 to the port 88, thence through the pipe 94 to the bottom of the air cylinder 32. The piston in the air cylinder is of course in downward position and is forced upwardly by ingress of air to the bottom of the cylinder. As the piston moves upwardly, the coupling or crosshead 46 is moved upwardly by the piston thereof, causing the crosshead to contact the washer 96 to contract the spring 98 against the washer 100.

When the piston is adjacent the top of the cylinder 32, enough force will be built up in the spring 98 to move the rod 104 upwardly, thereby moving the pin 124 downwardly, causing the upper portion of the lever 122 to move upwardly until the ball 164 snaps in the lower opening 166. Upward movement of the outer end of the lever 122, of course, causes the piston 82 to move downwardly, shutting off supply of air to the pipe 94 and causing registering between the cored passage 136 and the port 90, which port then causes supply of compressed air to the pipe 144 which is in communication with the upper portion of the cylinder 32. The port 88 will have registered with the cored passage 142 which is in communication with the exhaust port 140. Supply of compressed air to the upper portion of the cylinder 32 causes the piston to travel downwardly, exhausting the air thereunder through the pipe 94, port 88, cored passage 142, exhaust port 140 and pipe 146. The piston will travel downwardly until the crosshead causes compression of the spring 150, which will operate the rod 104 downwardly, thereby depressing the lever 122. Of course upward and downward movement of the piston in the cylinder 32 operates the pump to supply liquid to the measuring chamber through the fill pipe 28.

When the proper level has been reached in the measuring chamber, the float 156 will be moved upwardly, moving the float trip rod 74, releasing the lever 72, causing closing of the whistle valve 64, thereby cutting off supply of air to the piston. Any excess supplied liquid will flow through the overflow pipe 158 back to the source of liquid supply.

It will be appreciated that with the construction described, that the leakage of the air in any part will not affect the operation of the device, and it will be appreciated that should any portion of the automatic control become inoperative, hand operation of the pump 30 through the fitting 42 can take place to fill the measuring chamber in the usual manner.

It is to be understood that we do not wish to be limited by the exact embodiment of the device shown, which is merely by way of illustration and not limitation, as various and other forms of the device will of course be apparent to those skilled in the art without departing from the spirit of the invention or the scope of the claims.

We claim:

1. In liquid dispensing apparatus, the combination of a measuring container, a pump for pumping liquid to said measuring container, an air cylinder having a piston therein for actuating said pump, an air line connected to each end of said cylinder for actuating said piston, a valve for directing the flow of air to each end of the cylinder after a predetermined movement of said piston, means in said air line for controlling the flow of air to said valve, and means cooperating with said valve for preventing actuation of said valve only after a predetermined movement of said piston whereby said valve is fully operated.

2. In liquid dispensing apparatus, the combination of a measuring container, a pump for pumping liquid to said measuring container, an air cylinder having a piston therein for actuating said pump, an air line connected to each end of said cylinder for actuating said piston, a valve for directing the flow of air to each end of the cylinder after a predetermined movement of said piston, means in said air line for controlling the flow of air to said valve, means in said measuring container for operating said last named means when a predetermined amount of liquid is supplied to said container, and means cooperating with said valve for preventing actuation of said valve only after a predetermined movement of said piston whereby said valve is fully operated.

3. In liquid dispensing apparatus, the combination of a measuring container, a pump for pumping liquid to said measuring container, an air cylinder having a piston therein for actuating said pump, an air line connected to each end of said cylinder for actuating said piston, a valve operated by said piston for directing the flow of air to each end of the cylinder after a predetermined movement of said piston, a manually operated valve provided with means for latching said valve in open position for controlling the flow of air to said first named valve, and means cooperating with said first named valve for preventing actuation of said first named valve only after a predetermined movement of said piston whereby said first named valve is fully operated to prevent balancing thereof.

4. In liquid dispensing apparatus, the combination of a measuring container, a pump for pumping liquid to said measuring container, an air cylinder having a piston therein for actuating said pump, an air line connected to each end of said cylinder for actuating said piston, a valve for directing the flow of air to each end of the cylinder after a predetermined movement of said piston, means in said air line for controlling the flow of air to said valve, means in said measuring container for operating said last named means when a predetermined amount of liquid is supplied to said container, manually operable means for simultaneously operating said first named means to position to supply air to said valve and to connect said first named means and said second named means whereby said second named means is effective to operate said first named means, and means cooperating with said valve for preventing actuation of said valve only after a predetermined movement of said piston whereby said valve is fully operated.

5. In liquid dispensing apparatus, the combination of a measuring container, a pump for pumping liquid to said measuring container, an air cylinder having a piston therein for actuating said pump, an air line connected to each end of said cylinder for actuating said piston, a valve for directing the flow of air to each end of the cylinder after a predetermined movement of said piston, means in said air line for controlling the flow of air to said valve, means in said measuring container for operating said last named means when a predetermined amount of liquid is supplied to said container, a valve in said air line for rendering the apparatus inoperative, and means on the pump for manually operating said pump after said last named valve is rendered inoperative.

6. In liquid dispensing apparatus, the combination of an elevated container from which liquid is dispensed, pumping means for supplying liquid to said container, means for operating said pumping means, an air line connected to said second named means, a piston valve in said line for controlling operation of said second means, a whistle valve in said air line, manual means for operating said whistle valve, latch means for maintaining said whistle valve open, control means for closing said whistle valve, automatic means coordinated with said pumping means for operating said piston valve whereby air is directed to the ends of said piston successively, a normally open whistle valve in said air line operable to closed position whereby the apparatus can be manually operated through the pump.

7. In liquid dispensing apparatus, the combination of a pump for pumping liquid to be dispensed, an air cylinder having a piston therein for actuating said pump, an air line connected to each end of said cylinder for actuating said piston, a valve for directing the flow of air to each end of said cylinder after a predetermined movement of said piston, means in said air line for controlling flow of air to said valve, and means cooperating with said valve for preventing actuation of said valve only after a predetermined movement of said piston whereby said valve is fully operated.

Signed at Fort Wayne, Indiana, this fourth day of October, 1929.

ROBERT J. JAUCH.
HARRY L. MITCHELL.